United States Patent [19]

Naske

[11] Patent Number: 4,548,623

[45] Date of Patent: Oct. 22, 1985

[54] PERFORATED TROUGH CONDITIONING DEVICE

[75] Inventor: Marcel Naske, New Westminster, Canada

[73] Assignee: Helix Collector Syndicate, Vancouver, Canada

[21] Appl. No.: 529,515

[22] Filed: Sep. 6, 1983

[51] Int. Cl.[4] .................................................. B01D 47/00
[52] U.S. Cl. ........................................... 55/233; 55/242; 55/259; 55/474; 55/479; 34/147; 55/96
[58] Field of Search ................................. 55/77–79, 55/96, 97–99, 387, 90, 474, 233, 259, 479, 242, 295, 520, 337; 34/147

[56] References Cited

U.S. PATENT DOCUMENTS

| | | | |
|---|---|---|---|
| 1,577,703 | 3/1926 | Fedler | 55/96 |
| 2,493,356 | 1/1950 | Mercier et al. | 55/474 |
| 3,016,107 | 1/1962 | Strange et al. | 55/386 |
| 3,151,187 | 9/1964 | Compte | 55/97 |
| 3,912,466 | 10/1975 | Zenz | 55/96 |
| 4,256,045 | 3/1981 | Johnson, Jr. | 55/96 |

FOREIGN PATENT DOCUMENTS 676836  8/1979  U.S.S.R. ................. 34/147

*Primary Examiner*—Bernard Nozick
*Attorney, Agent, or Firm*—Ridout & Maybee

[57] ABSTRACT

An apparatus for conditioning a fluid stream or a flow of granular solids at high volume and low velocity comprising a substantially closed cylindrical body having its side walls defined by a permeable helical trough joined to a vertically inclined baffle; means to convey the fluid through the body and out through the permeable trough; in a fluid conditioning apparatus, the fluid being conditioned upon passing the fluid through the helical trough or through the helical trough and a layer of particulate supported thereon; and in a solids conditioning apparatus, the solids being supported on the helical trough, and being conditioned upon passing fluid through the solids and through the helical trough.

5 Claims, 9 Drawing Figures

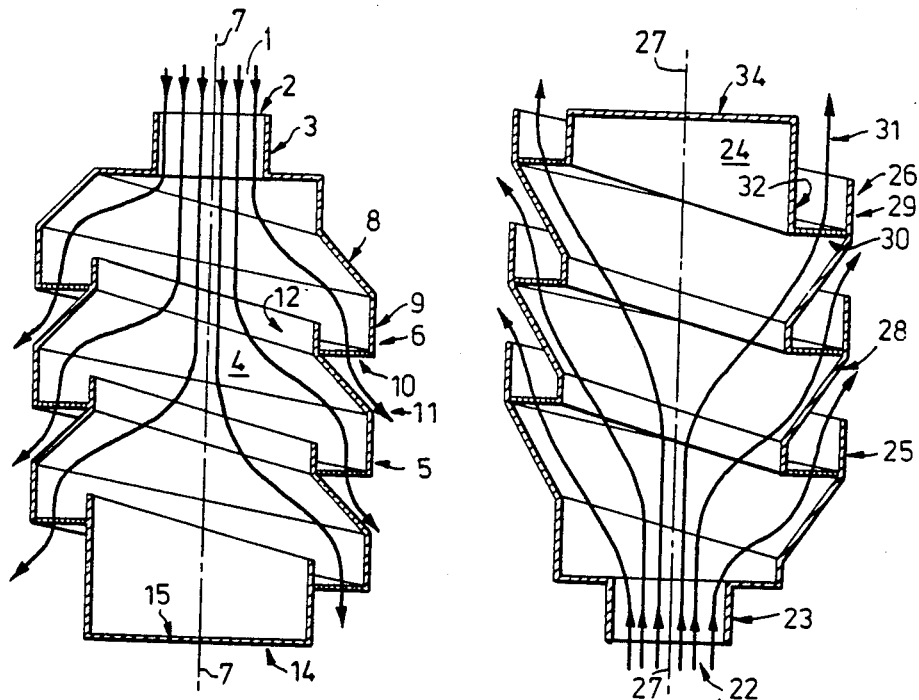
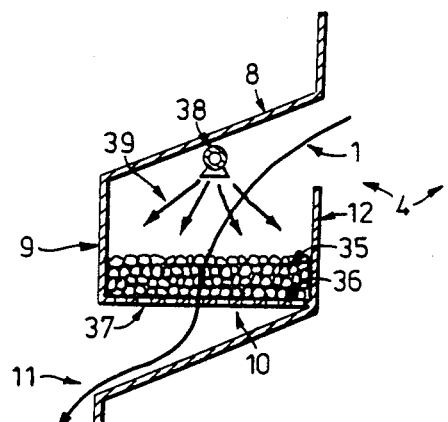
FIG. 1
FIG. 2
FIG. 3

FIG 7
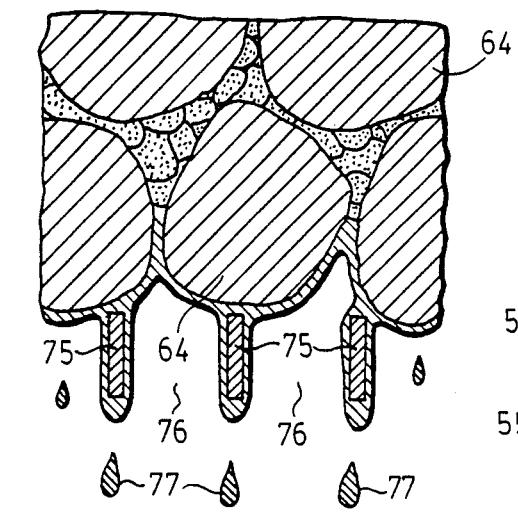
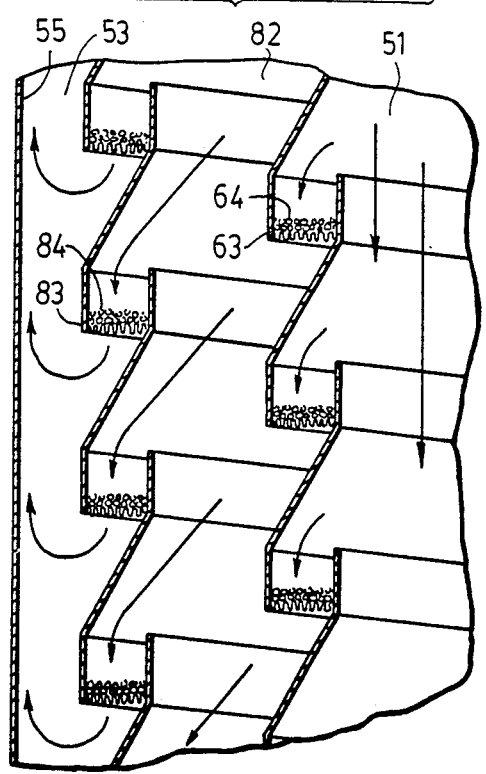
FIG. 9
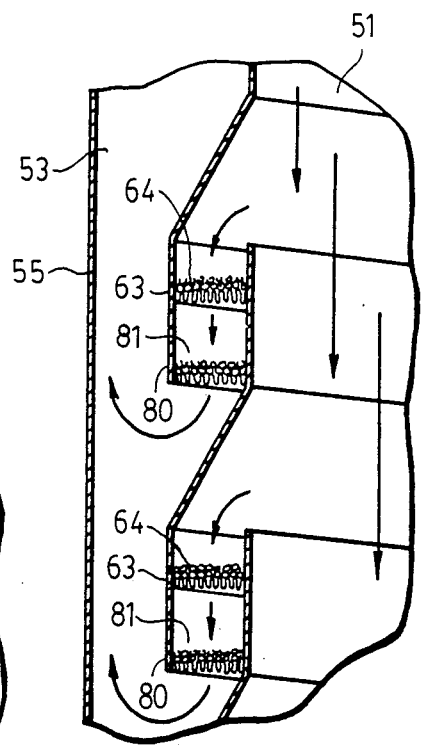
FIG. 8

PERFORATED TROUGH CONDITIONING DEVICE

FIELD OF THE INVENTION

This invention relates to the field of fluid and solid conditioning, for example for pollution abatement by chemical or physical separation.

BACKGROUND OF THE INVENTION

Fluid streams containing combinations of gases and liquids, and with or without solids, are conditioned in a variety of ways. Undesirable elements contained in a fluid stream may be removed by mechanical means or by chemical means. Often particulate is used in the conditioner to enhance the operation of the chemical or mechanical process.

Prior art devices of this kind have generally been concerned to develop a reasonably compact efficient conditioner which allows for sufficient contact between the fluid stream and the conditioning apparatus to properly condition the fluid stream. Where conditioning is conducted with the use of particulate, it is also important in many applications to provide means to regenerate the particulate and means to prevent clumping of the particulate. Means are often provided to prevent channeling of the fluid stream.

One way to provide for this contact is to provide the conditioning means in a columnar or tower form and to force the fluid stream through. Generally in an apparatus of this type, a relatively large amount of energy will be required to move the fluid stream because of the depth of the particulate. Such designs also make it difficult to provide for the removal and regeneration of the particulate.

Another more common way is to provide for a long path during which there is contact between the fluid stream and the conditioning means. Such a long path requires a very large conditioning apparatus unless means are taken to save space. One method is to make the path helical.

Thus in U.S. Pat. No. 2,688,807, Ginther, issued Sept. 14, 1954, a drying apparatus is disclosed in which a gas stream passes along the length of a trough mainly contacting the uppermost particles of the particulate contained in the trough. However, in the Ginther apparatus, a relatively smaller passage is provided for the gas than in the columnar or tower configuration. This allows for a relatively smaller volumetric flow of gas through the apparatus. In order to deal with an efficient quantity of gas, a relatively higher gas velocity must be utilized, thus decreasing the contact time between the gas and the particulate.

DESCRIPTION OF THE INVENTION

Thus it is hoped in the present invention to avoid many of the disadvantages of the columnar and helical trough type of apparatus by providing in general a permeable helical trough disposed about a cylindrical space. The fluid to be conditioned passes through the permeable helical trough on which may be disposed various conditioning means, such as particulate. Alternatively the permeable trough may itself act as a filter without the use of particulate.

Compared to helical drying or conditioning devices known, this apparatus in one of its aspects provides a relatively high volume, low velocity conditioner so that a greater contact between the conditioning means, such as particulate matter, and the fluid stream can be achieved in a lesser space.

In the embodiments utilizing a layer of particulates, the apparatus may be provided with means to move the particulate either vertically upward or downward along the trough. Means may be provided to regenerate and recycle the particulate. Means may be provided to wet the particulate to improve conditioning. Means may be provided to vibrate the particulate to minimize clumping of the particulate.

Thus the invention in one of its main aspects comprises:

a hollow vertical substantially cylindrical structure comprising a surrounding helical side wall and helical baffle and being closed at one end and open at the other end;

a helical trough, having a receiving end and a discharge end and a permeable bottom, said trough being interposed between the helical side wall and the helical baffle; the helical baffle connected to the trough and the said side wall so that substantially the only conduit to channel gas out of the cylindrical structure is through the permeable trough bottom;

means for introducing a layer of particulate onto the receiving end of the trough;

vibrating means for moving a layer of particulate along the trough from the receiving end to the discharge end thereof;

means for transporting gas for conditioning into the cylindrical structure and through the permeable trough bottom and the layer of particulate thereon;

means for applying a liquid to the layer of particulate along the trough to enhance conditioning of the gas;

means for removing the layer of particulate from the trough;

means for regenerating the particulate; and means for returning the particulate to the receiving end of the trough.

PREFERRED EMBODIMENT

The features of the present invention will become apparent upon a review of the preferred embodiments as shown in accompanying drawings in which:

FIG. 1 is a simplified representation of the preferred embodiment of the present invention;

FIG. 2 is a simplified view of another embodiment of the present invention;

FIG. 3 is a fragmentary sectional view of a helical trough member of another embodiment of the present invention;

FIG. 7 is an enlarged fragmentary sectional view of the trough and particulate layer of FIG. 6;

FIG. 8 and FIG. 9 are enlarged fragmentary sectional views of modified forms of the invention in which the fluid passes through a series of troughs and particulate layers supported thereon.

Figure 4:
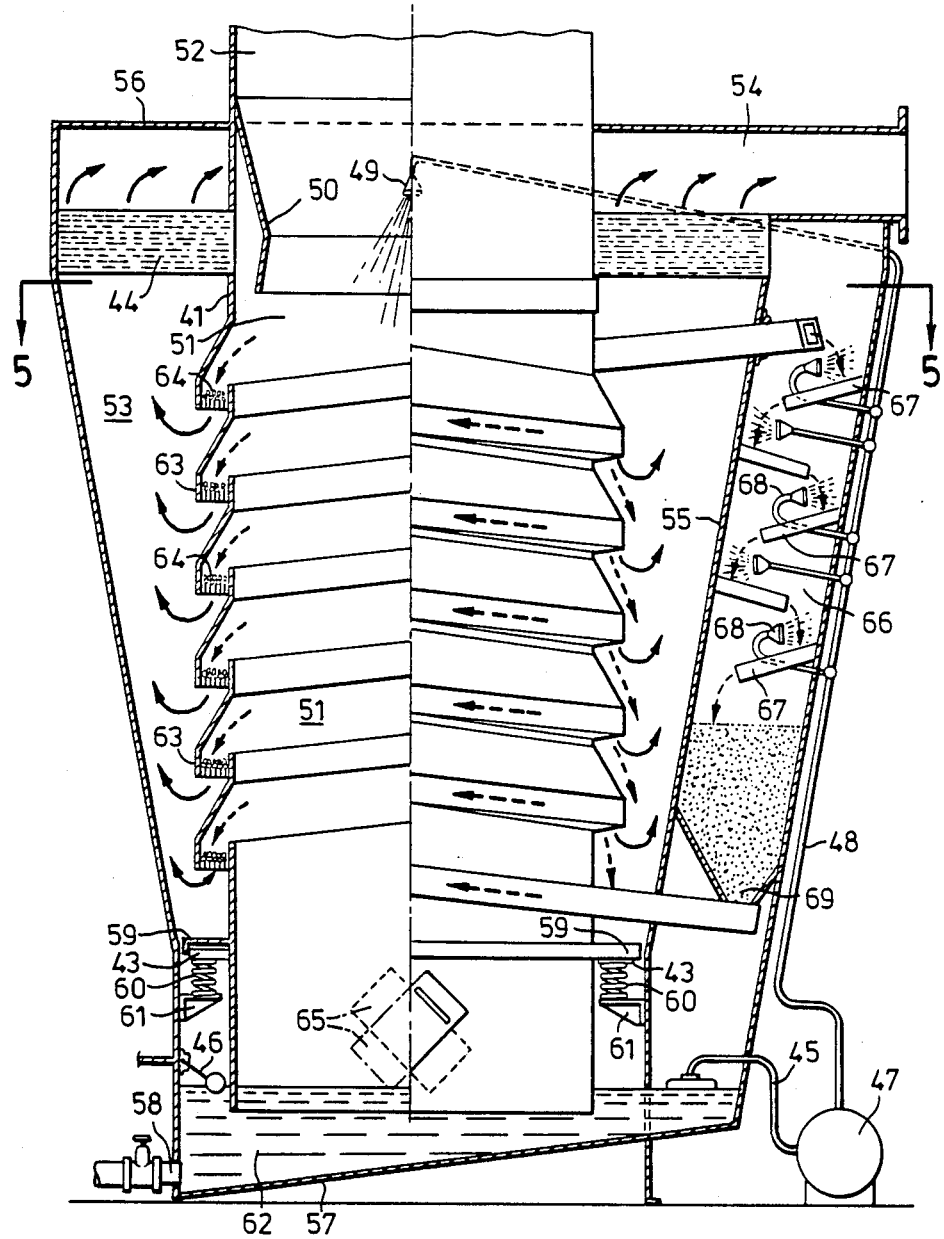
FIG. 4 is a front elevational view of the fluid conditioner of the present invention partially in section through the inner and outer chambers thereof.

In reference to FIG. 1, the perferred embodiment of the present invention is shown with a fluid stream 1 entering fluid inlet 2 as defined by the upper collar member 3. The fluid stream 1 may be introduced into the inner chamber 4 of the cylindrical body 5 by either pressure or vacuum means (not shown), the selection of which would be determined by the design parameters for the particular application. The inner chamber is defined at its lower end by lower closure member 14.

Upon entering the inner chamber 4, the fluid passes through a trough 6 helically wound about the axis 7 of the cylindrical body 5. Vertically inclined baffle 8 is helically disposed about axis 7 and connected with outer wall 9 of trough 6 to comprise a substantial portion of the side wall of the cylindrical body 5. The perforated floor 10 of the trough provides a helically wound surface through which the fluid stream 11 may exit from the inner chamber of the body. Inner wall 12 of the trough 6 provides a barrier preventing any previously collected material from falling over the inner edge of floor 10 and back into the inner chamber. Any heavy entrained particles or other impurities in the fluid stream will fall to the floor 15 of the cylindrical body.

An alternate embodiment of the apparatus provides a porous floor in the helical trough to remove dry solid particles from a gas stream. The porous floor may be made from a pliable, textured cloth membrane of sufficient density to capture and retain the impurities. Vibrating means may be provided to dislodge minute impurities from the cloth membrane and move the deposited filter cake along the helical trough to the discharge end thereof. Continuous cake removal would permit the filter apparatus to continuously condition the gas stream.

In FIG. 2, another embodiment of the present invention is shown wherein a fluid stream 21 enters the inner chamber 24 through an inlet 22 provided in lower closure member 23. The cylindrical body 25, having axis 27, has its outer walls defined by a helically wound inclined baffle member 28 which joins corresponding inner wall portion 32 and outer wall portion 29 of trough 26. More specifically, the inclined baffle member is inclined upwardly and outwardly from the inner wall 32 to the corresponding wall 29 of trough 26, whereas in FIG. 1, the inclination from inner to outer wall is upwardly and inwardly between corresponding walls. Top plate 34 and the side walls of the body enclose the inner chamber 24. Perforated floor 30 provides a helically wound surface which acts as a fluid exit means for fluid stream 31. This configuration may be used in filtering applications where it is desirable to remove solid impurities. This embodiment may also be used where the directional flow of the fluid would be reversed relative to that represented in FIG. 2. In reversing the fluid flow, it would be necessary to introduce the fluid from an outer body (not shown) downward through the perforated floor 30, into the chamber 24, and out through the opening identified previously as inlet 22.

Other modifications to the embodiment shown in FIGS. 1 and 2 include the addition of a layer of particulate material (not shown in FIGS. 1 and 2) onto the porous floor 30 of trough 26. Depending upon its chemical and physical properties, the particulate layer may be used as a filtering aid, absorbent or adsorbent. Still other applications may provide for the addition of a wetting liquid to enhance mass transfer processes such as gas-liquid absorption.

Still another embodiment of the invention provides for the chemical conditioning of a fluid stream by contacting the fluid stream with a reactive particulate layer transported along the helical trough. In such an embodiment, a catalyst or reactive chemical in granular form would move along the helical trough as a layer of particulate contacting the active gas and generating the desired reaction.

In FIG. 3, for example, a fluid stream 1 passes from the inner chamber 4 and into the channel defined by inclined baffle 8, inner wall 12 and outer wall 9 of the trough. The fluid stream is wetted by a liquid spray 39 produced by spray assemblies 38. The wetted fluid passes through a layer of particulate material 35 supported by mesh or grate members 36 in perforated floor 10. The mesh or grate members must be sufficiently closely spaced to retain the particulate material. The wetted fluid stream 1 contacts the particulate, which is also wetted, is conditioned by chemical or physical means and thereafter exits through perforations 37 as conditioned fluid 11.

The spray assembly in FIG. 3 may be installed as a discreet arrangement of nozzles located at various points along the trough, or alternatively, as a trickle tube type assembly suspended along the length of the trough.

Various embodiments of a fluid conditioning device of the present invention are shown in FIGS. 4 to 9 of the drawings. Although most applications of the embodiments therein disclosed are more readily adaptable to gas purification, alternate uses may relate to conditioning fluids of various compositions. Fluids containing mixtures of gas, solids and liquids may be treated chemically or physically by passing these fluids through an embodiment of the present invention. For example, the operation of gas absorption or gas adsorption transfer operations depend upon the appropriate selection of liquid sprays and/or particulate material. Similarly, if the desired result is the treatment of a moving layer of particulate, this may be carried out by selecting yet another appropriate fluid stream component, and if necessary, a suitable liquid for the spraying operation.

The fluid conditioning apparatus of the present invention may be modified in several ways to more efficiently condition specific gas streams, regenerate the purification material and/or control the humidity and temperature of the purified gas. For instance, it is preferable to have one or more spray nozzles mounted in the inlet to the substantially cylindrical body, in such a position as to spray water or another suitable liquid across the path of the incoming gas stream. Such spraying not only scrubs the incoming gas but also will wet the gas and particulate thus enhancing the removal efficiency of the particulate. With such a modification it may be desirable to maintain a liquid sump at the bottom of the inner chamber of sufficient height to close the bottom of the inner chamber.

If the apparatus is to be used continuously it is desirable to have included therein a particulate regeneration passageway or zone, one end of which is operably connected to the discharge end of the helical trough and the other end of which is operably connected to the receiving end of the helical trough. The passageway will have an applicator therein for continuously applying a regeneration media to the particulate.

Typically the regeneration media will be a liquid which is capable of washing the captured impurities from the particulate or a flame of sufficient temperature to burn the impurities off the particulate. Travel of the particulate through the passageway may be effected by gravity or forced movement such as by a screw conveyor. While the passageway may be positioned adjacent to but separate of the outer chamber, space can be conserved and a more compact unit obtained by positioning the regeneration passage way within the outer chamber but separate from the inner chamber.

The humidity and/or temperature of the purified outgoing gas may be controlled by interposing a humidity control means e.g. a condensor and/or a temperature control means e.g. a heater or refrigeration coil, across the outlet of the outer chamber.

If the incoming gas is not under sufficient pressure a fan may be mounted in the inlet to the inner chamber to force the gas stream into the inner chamber. Similarly the outlet of the outer chamber may also be fitted with a fan to draw the gas out of the outer chamber. For a better understanding of the present invention, a fluid conditioning device is described in reference to FIGS. 4 to 9.

Figure 5:
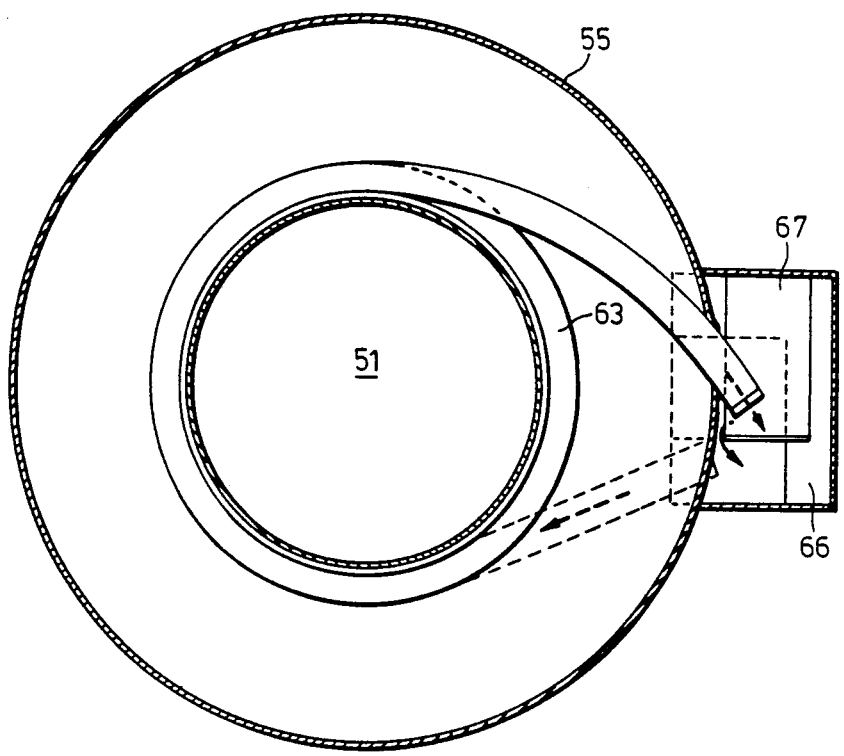
FIG. 5 is a partial top sectional view of FIG. 4 taken along line 4—4.

As shown in FIG. 4 and FIG. 5 the preferred embodiment of the fluid conditioning apparatus of this invention comprises a vertically disposed inner chamber 51 of general cylindrical shape having a cylindrically shaped inlet duct 52 at its upper end and being open at its lower end. The inlet 52 is flexibly and sealably connected to inner chamber 51 by rubber seals 41 and has a constriction 50 which increases the velocity of the incoming fluid. Chamber 51 is entirely enclosed by vertically disposed outer chamber 53 the lower portion of which is of cylindrical shape and the upper portion of which is frustoconically shaped. The frustoconical shape of the outer chamber helps keep the velocity of the fluid constant to control the pressure drop across the perforated trough. This shape is not essential, but is preferable for the particular embodiment shown in FIG. 4. A toroidally shaped skirt 59 of rectangular cross section is rigidly connected to the lower portion of the vertical wall of chamber 51 and extends radially outward therefrom but separable from side 55 of chamber 53. The outer chamber 53 has an outlet duct 54 extending through side 55 and adjacent to the upper horizontal side 56 thereof. Inlet 52 also extends through the horizontal side 56. A toroidally shaped condensor 44 is positioned at the upper end of chamber 53 adjacent to and below outlet duct 54 and extends across the space between side 55 and the vertical side of inlet duct 52. The lower side 57 of chamber 53 is inclined to the horizontal and at the lowest point thereof has an outlet drain 58 which is fitted with a valve. Fans (not shown) are positioned in the inlet duct 52 and the outlet duct 54 to force the fluid into the former and out of the latter. Spray nozzle 49 is positioned centrally in inlet 52 slightly above constriction 50 such that its spray field is directed radially and downwardly. The spray nozzle is operably connected by pipe 48 to the outlet of pump 47.

A vertical spiral perforated trough 63 spirals about the vertical side of chamber 51 from the top to the bottom thereof and openly communicates therewith. Supported on trough 63 is a layer of particulate 64.

The type of particulate used in this invention will depend upon the impurities which are to be removed from a fluid, such as gas. For instance cork may be used for dust; foam rubber for metal chips, saw dust for oily aerosols and charcoal or porous carbon for odours. Other materials include crushed rock, sand, Berl saddles and Raschig rings. In all instances the particle size of the material should be such that it will not pass through the perforations of the trough. The perforations in the helical trough may be of virtually any shape.

Chamber 51 is resiliently supported by four vertically positioned coil springs 60 (two are not shown), the individual tops of which are rigidly connected to base plates 43 mounted rigidly on the bottom of skirt 59 and spaced equidistant about the circumference thereof. The bottom of each coil spring 60 is mounted on a support plate 61 which extends radially inwardly from side 55 and is rigidly connected thereto.

The helical trough is resiliently supported such that it is capable of restricted movement in all directions. Inasmuch as the trough will usually be mounted on the vertical wall(s) of the substantially cylindrical body, it is convenient to merely resiliently support the entire cylindrical body (including the helical trough mounted thereon). Such support may be accomplished by suspending the cylindrical body on coil springs from the upper lateral surface of the outer chamber or mounting it on coil springs affixed to the lateral base of the enclosing chamber or support plates rigidly connected to the vertical wall of the outer chamber. The helical trough is used to project the particulate along the length of the helical trough in a series of short hops or trajectories. Such devices are essentially so called "directional throw units". The capacity of the device is determined by the magnitude of helical trough displacement, frequency of this displacement, angle of displacement, slope of helical trough and the ability of the material to receive and transmit through its mass the force exerted by the helical trough.

The trough vibrations may be generated by known mechanical, electrical, pneumatic or hydraulic devices such as by directly connected hinged rocker arms, eccentrically loaded wheels, pulsating electromagnets or pneumatic or hydraulic cylinders. One of the simplest and most readily adaptable to the gas purifying apparatus of this invention comprises a pair of electrically driven motors having eccentrically weighted rotors and housings directly coupled to the cylindrical body. Such motors involve roller masses rotating about bearings so that the masses generate centrifugal forces which are reactively opposed by the bearings. The bearings are supported on the housing and in response to the aforesaid centrifugal forces exert a periodic inertial force to the housing and thus to the helical trough.

With reference to FIG. 4, a pair of electrically driven vibration generators 65 are rigidly coupled to the vertical side of chamber 51 close to the bottom thereof, but above the level of liquid 62. The generators 65 are positioned diametrically opposite each other on the vertical side of chamber 51 and their axes of rotation are angularly displaced from each other. The eccentrically weighted rotors of the generators 65 rotate in the same direction e.g. counterclockwise.

Chamber 51 extends downwardly to a position relatively close to the lower side 57 and when the outer chamber 53 has been filled with liquid 62 to a level just above the lower edge of the open bottom of chamber 51 the liquid 62 prevents the fluid in chamber 51 from entering chamber 53 via the open bottom of chamber 51. The level of liquid 62 is regulated by float valves 46. The inlet of pump 47 is connected to liquid 62 by pipe 45.

A vertical regeneration passageway 66 is positioned adjacent to the side 55. A series of overlapping baffles 67 which are alternatingly inclined positively and negatively relative to horizontal are positioned on passageway 66 and are alternatingly rigidly connected to side 55 and the outer side of passageway 66. Spray nozzles 68 are positioned opposite each of the unsupported ends of the baffles 67 and are operably connected by pipe 48 to the outlet of pump 47. The upper (discharge) end of trough 63 extends through side 55 and into the upper end of passageway 66 and the lower end of passageway 66 feeds onto the lower (receiving) end of trough 63 from outlet 69.

Figure 6:
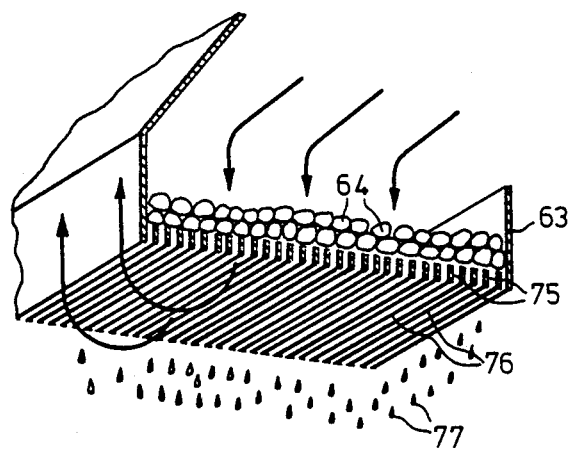
FIG. 6 is an enlarged fragmentary perspective view of a portion of the trough and the particulate layer supported thereon as shown in FIG. 4.

In operation, unconditioned fluid enters inlet duct 52 where nozzle 49 sprays the fluid with liquid 62 causing large solid particles in the fluid to be entrapped by the droplets of liquid 62, which by force of gravity drop down through chamber 51 to the sump of liquid 62. As shown in FIG. 4 and FIG. 6 the vertical side of chamber 51 is so contoured in the vicinity of trough 63 that as the fluid enters chamber 51 from inlet duct 52 the fluid is drawn by the suction from the fan positioned in outlet duct 54 downwardly into the trough 63 and through the particulate layer 64. Since the fluid is wet with liquid 62 when it impinges upon the particulate layer 64, the liquid 62 in the fluid tends to condense upon the particulate layer 64. As shown in FIG. 7, the motion of these particles relative to one another from the vibration of trough 63 causes the condensed liquid to foam. In addition to the inherent absorbent properties of particulate layer 64, this interstitial foam also provides an efficient medium for entrapping impurities. The bottom of the trough 63 consists of a plurality of parallel, equidistant bars 75. The size of the slot perforations 76 will determine the size of the particles supported on the trough. Particles which have broken down with use will fall through the slots 76 and into the liquid sump 62. Perforations in the trough floor may be provided in alternative patterns, such as mesh or grids (not shown). The choice of a pattern may affect the throw capacity of the vibrating trough. The purified fluid exits from trough 63 through the slot perforations 76 into chamber 53. Any liquid 62 which has condensed on particulate layer 64 as the fluid passes therethrough tends to form droplets 77 which ultimately fall from trough 63 into the sump of liquid 62 at the bottom of chamber 53. From chamber 53 the fluid passes through condensor 44, where excess liquid is removed, and out of the apparatus via outlet duct 54.

The vibrations of trough 63 cause the particles of layer 64 thereon to be continuously projected upwardly along the path of trough 63. These vibrations also afford the advantages of keeping material 64 distributed uniformly on trough 63, providing maximum exposure of particulate layer 64 to the fluid and preventing the particulate layer of 64 from agglomerating and compacting. It is to be understood that it is equally possible to provide means to actuate the trough to move the layer of particulate downwardly along the path of the trough. The selection of the appropriate direction in some cases depend upon energy saving considerations. The impurities absorbed by or entrapped in particulate layer 64 are removed therefrom by depositing material 64 from the upper end of trough 63 onto the uppermost baffle 67 in regeneration passageway 66. The particulate 64 cascades down the series of baffles 67 and is washed and cleaned by a spray of liquid 62 from nozzles 68. The thus cleansed particulate collects at the bottom of the passageway 66 and is returned to the lower end of trough 63 by outlet 69.

FIG. 8 and FIG. 9 show modifications of the apparatus of FIG. 4 and FIG. 5 which involve a plurality of layers of particulate supported on multiple layered troughs. These modifications are especially advantageous where fluid contains a variety of impurities, the removal of which requires two or more different layers of particulate or more than a single pass. FIG. 8 illustrates a modification wherein a second trough 80, identical in construction to trough 63 and on which is supported a particulate layer 81, which may be the same or different from particulate layer 4, is positioned directly below and parallel to trough 63 such that the fluid first passes into trough 63 and through particulate 64 and then into trough 80 and through particulate 81 before exiting into chamber 53. FIG. 9 shows a modification wherein a second vibrating chamber 82 and trough 83, identical in construction to chamber 51 and trough 63 except as regards circumferential size, are positioned annularly to chamber 51 and trough 63. The fluid first passes from chamber 51 into trough 63, through particulate 64 and into chamber 82 and then into trough 83 and through particulate 84, which is supported on trough 83, before exiting into chamber 53.

It is to be understood that the foregoing description is not intended to limit the invention, since changes and modifications may occur to those skilled in the art which do not depart from the spirit of the invention and which come within the scope of the appended claims.

What is claimed is:

1. A gas conditioning apparatus comprising:
    (a) a hollow vertical substantially cylindrical structure comprising a surrounding helical outer wall and helical baffle and being closed at one end and open at the other end;
    (b) a helical trough, having a receiving end and a discharge end and a permeable bottom, said trough being interposed between and connecting the helical outer wall and the helical baffle and supporting a layer of particulate;
    (c) the helical baffle connected to the trough and the said outer wall so that substantially the only conduit to channel gas out of the cylindrical structure is through the permeable trough bottom;
    (d) means for introducing a layer of particulate onto the receiving end of the trough;
    (e) vibrating means for moving a layer of particulate along the trough from the receiving end to the discharge end thereof;
    (f) means for transporting gas for conditioning into the cylindrical structure and through the permeable trough bottom and the layer of particulate thereon;
    (g) means for applying a liquid to the layer of particulate along the trough to enhance conditioning of the gas;
    (h) means for removing the layer of particulate from the trough;
    (i) means for regenerating the particulate; and
    (j) means for returning the particulate to the receiving end of the trough.

2. An apparatus as claimed in claim 1, wherein the substantially cylindrical structure defines an inner chamber; and further having an inverted frustoconical structure enclosing the cylindrical structure and comprising an outer chamber, said outer chamber shaped to receive and collect gas flowing out of the inner chamber through the trough bottom; and having an outlet for conditioned gas to flow out of the outer chamber.

3. An apparatus as claimed in claim 2, wherein a vertical passageway is provided in the outer chamber for reconditioning of the particulate material.

4. An apparatus as claimed in claim 3, wherein the vertical passageway comprises a series of inclined baffles and a series of spray heads directed onto the baffles so that the particulate is washed as it descends by gravity through the passageway.

5. An apparatus as claimed in claims 1 or 4, wherein the means for applying a liquid to the layer of particulate comprise a pipe containing a liquid under pressure disposed above the helical trough, the pipe having openings for liquid along its length.

* * * * *